D. F. CONNELL & E. FAGAN.
Hard-Rubber Compound.

No. 216,153. Patented June 3, 1879.

WITNESSES:
W. W. Hollingsworth
Amos W. Hart

INVENTOR:
D. F. Connell
E. Fagan
BY
ATTORNEYS.

UNITED STATES PATENT OFFICE.

DANIEL F. CONNELL, OF BROOKLYN, AND EDWARD FAGAN, OF NEW YORK, N. Y.

IMPROVEMENT IN HARD-RUBBER COMPOUNDS.

Specification forming part of Letters Patent No. 216,153, dated June 3, 1879; application filed March 8, 1879.

*To all whom it may concern:*

Be it known that we, DANIEL F. CONNELL, of Brooklyn, in the county of Kings and State of New York, and EDWARD FAGAN, of New York city, New York, have invented a new and Improved Hard-Rubber Compound; and we do hereby declare that the following is a full, clear, and exact description of the same.

Our invention relates to an improvement in hard-rubber manufacture, whereby we produce a superior article adapted for various uses.

The invention consists in imparting increased strength, as well as density and a highly ornamental appearance, to rubber by incorporating with it strips or shreds of thin sheet metal, such as tin-foil, and then vulcanizing the composition.

Figure 1:
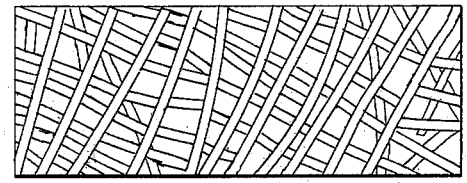

The mode of carrying out the invention is as follows: We take a quantity of caoutchouc, or other vulcanizable gum, which has been prepared for vulcanization by admixture of other materials, (according to the well-known Goodyear process,) and we roll this prepared substance into a thin sheet. We next cut a sheet of tin-foil into narrow strips, and lay them upon the rubber sheet, as shown in Figure 1 of accompanying drawings, without reference to any particular arrangement of strips. The rubber is then subjected to pressure by being passed between heated rollers; or it may be masticated or treated in any other manner which will cause the thorough intermingling of the metal with the rubber or gum.

Figure 2:
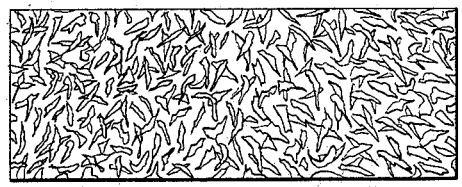

In such operation the metal strips will be divided and torn into finer strips or pieces and uniformly disseminated through the rubber, so that the latter will have an appearance substantially as represented in Fig. 2. The composite mass is then rolled to the thickness required for any particular purpose, and placed in a mold to give it the shape of the article required, and then subjected to a heat of 310° Fahrenheit, or thereabout. Of course, the weight of the product will exceed that of the gum entering into its composition to the extent of the weight of metal that has been added; but the result chiefly sought and attained will be a great increase in tensile strength, and such extreme rigidity that the product will have no perceptible elasticity. This result depends chiefly upon the fibrous nature of the metal and the extension or form of the shreds into which it is divided.

The surface of the compound will have a beautiful or highly ornamental appearance.

Where the requisite form has not been imparted by the mold the compound may be cut, turned, or otherwise fashioned like hard wood or soft metal, and subsequently polished to a high degree.

It is adapted for many uses, or for forming many articles of manufacture, for which ordinary hard rubber is unsuitable on account of deficiency in weight, strength, or the required ornamental appearance.

We are aware metal dust or filings have been mixed with india-rubber, rendered soft by solvents, for the purpose of forming a plastic compound suitable for use as a covering for roofs, floors, trunks, &c.; also, that metal plates have likewise been placed upon or partly embedded in the surface of molded rubber, and the latter then subjected to the vulcanizing process, thus producing rubber drinking-cups, or other like articles having a metal exterior, which may be ornamented in various ways or with various designs.

We do not claim such manufactures.

What we do claim is—

The improved article of hard-rubber manufacture, formed of strips or sheets of metal foil and caoutchouc, the strips or shreds being distributed through and intimately commingled with the latter, as described.

D. F. CONNELL.
EDWARD FAGAN.

Witnesses:
THOMAS F. McGOWAN,
WILMOT C. HOFF.